United States Patent [19]

Philippides

[11] Patent Number: 4,479,217
[45] Date of Patent: Oct. 23, 1984

[54] MESSAGE IDENTIFICATION AND DATA ENTRY APPARATUS

[75] Inventor: Constantinos Philippides, Columbia, Md.

[73] Assignee: The United States of America as represented by the Secretary of the Navy, Washington, D.C.

[21] Appl. No.: 276,316

[22] Filed: Jun. 22, 1981

[51] Int. Cl.³ .............................................. G06F 11/00
[52] U.S. Cl. ........................................ 371/67; 371/68; 340/146.2
[58] Field of Search ............... 371/67, 68, 69, 70, 371/49; 340/146.2; 364/200 MS File, 900 MS File

[56] References Cited

U.S. PATENT DOCUMENTS

| | | | |
|---|---|---|---|
| 3,199,077 | 8/1965 | Prather | 371/70 |
| 3,351,919 | 11/1967 | Milford | 371/70 |
| 3,492,643 | 1/1970 | Sibley | 340/146.1 |
| 3,676,849 | 7/1972 | Malandro et al. | 340/146.2 |
| 3,713,095 | 1/1973 | McPherson | 340/146.1 AB |
| 3,779,458 | 12/1973 | Chang et al. | 371/67 |
| 3,934,131 | 1/1976 | Perschy | 371/70 |
| 3,976,865 | 8/1976 | Enger | 371/67 |
| 4,007,439 | 2/1977 | Semmelhaack et al. | 340/146.2 |
| 4,045,771 | 8/1977 | Loreck | 371/70 |
| 4,135,240 | 1/1979 | Ritchie | 364/200 |
| 4,195,351 | 3/1980 | Barner et al. | 364/900 |
| 4,200,838 | 4/1980 | Poitevin | 371/68 |
| 4,205,302 | 5/1980 | Godo | 371/67 |
| 4,227,175 | 10/1980 | Newman | 340/146.2 |
| 4,346,474 | 8/1982 | Sze | 364/200 |
| 4,349,904 | 9/1982 | Janssen et al. | 371/69 |

FOREIGN PATENT DOCUMENTS 1002803  9/1965  United Kingdom .

Primary Examiner—Jerry Smith
Assistant Examiner—Gary V. Harkcom
Attorney, Agent, or Firm—Robert F. Beers; Thomas M. Phillips

[57] ABSTRACT

Apparatus for data entry and error detection of digital information. Data clocked into a register undergoes a correlation comparison against a data word already stored within the comparator circuit and a convolution check in which the bits of the data word are compared with each other in a predetermined order. If the input data satisfies these tests, the data word is placed in memory where it may be acted upon by other devices.

2 Claims, 3 Drawing Figures

MESSAGE CORRELATION, DECODING, AND PROCESSING FOR LINK COMMUNICATIONS

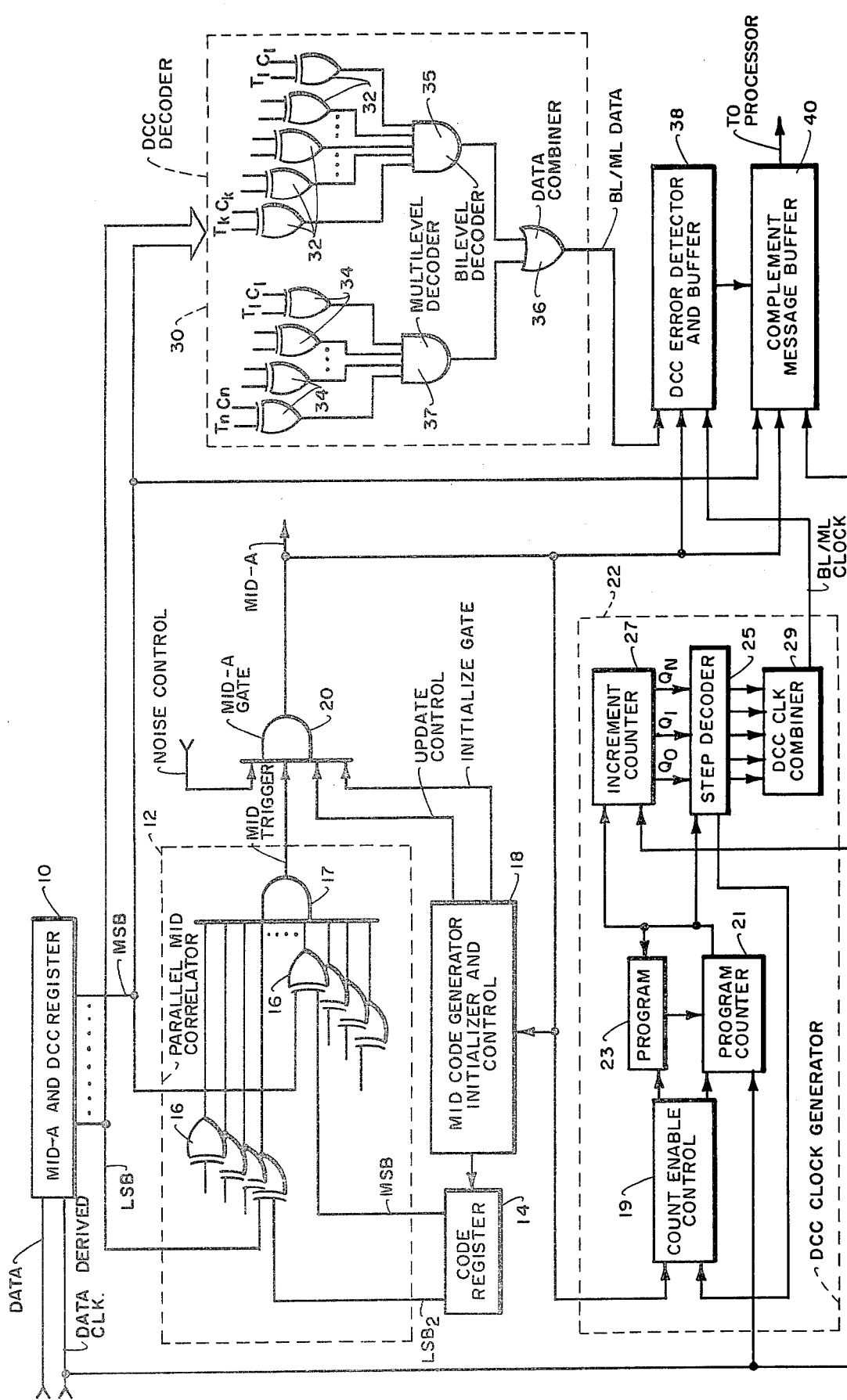
Fig. 1. MESSAGE CORRELATION, DECODING, AND PROCESSING FOR LINK COMMUNICATIONS

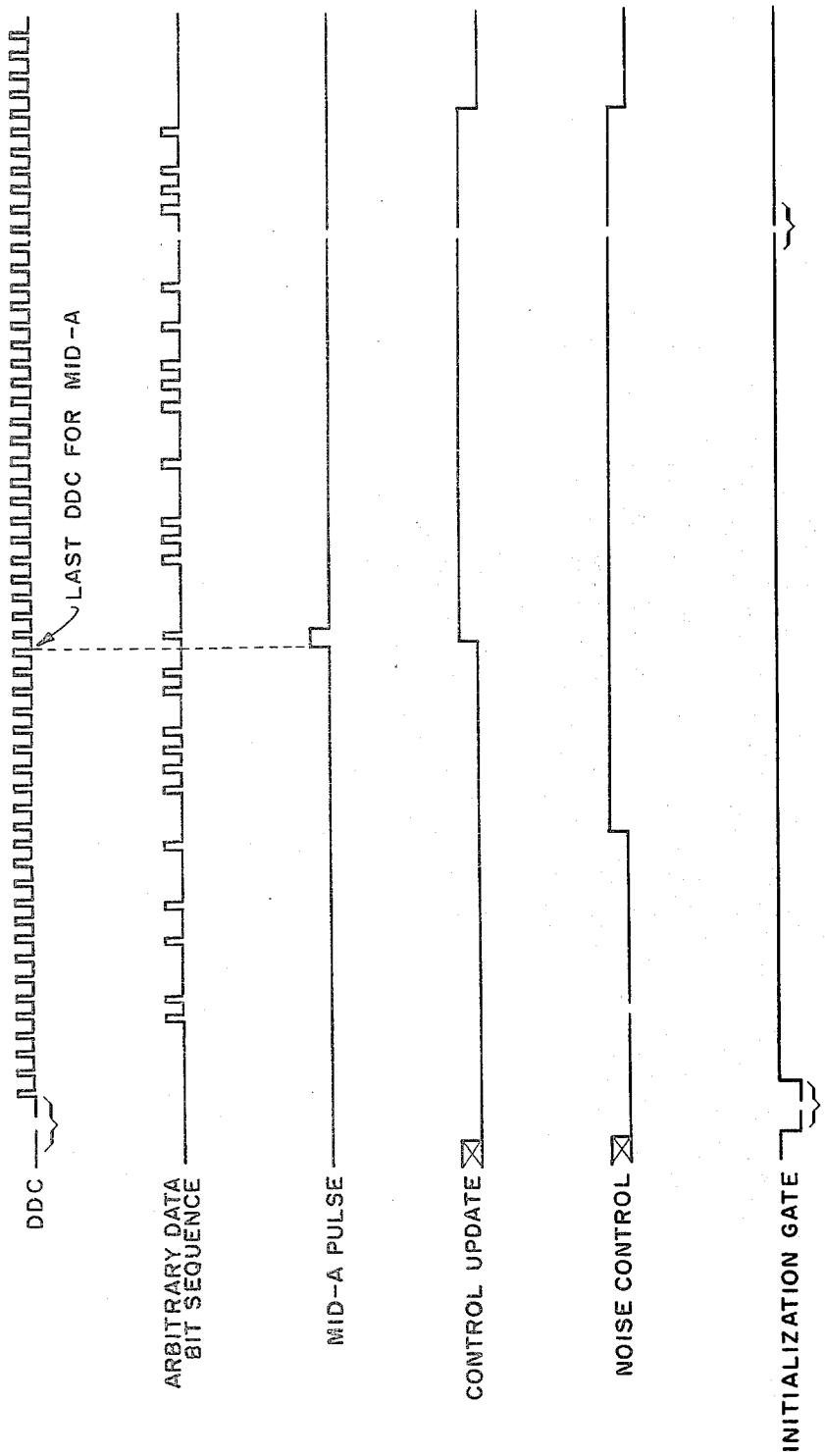

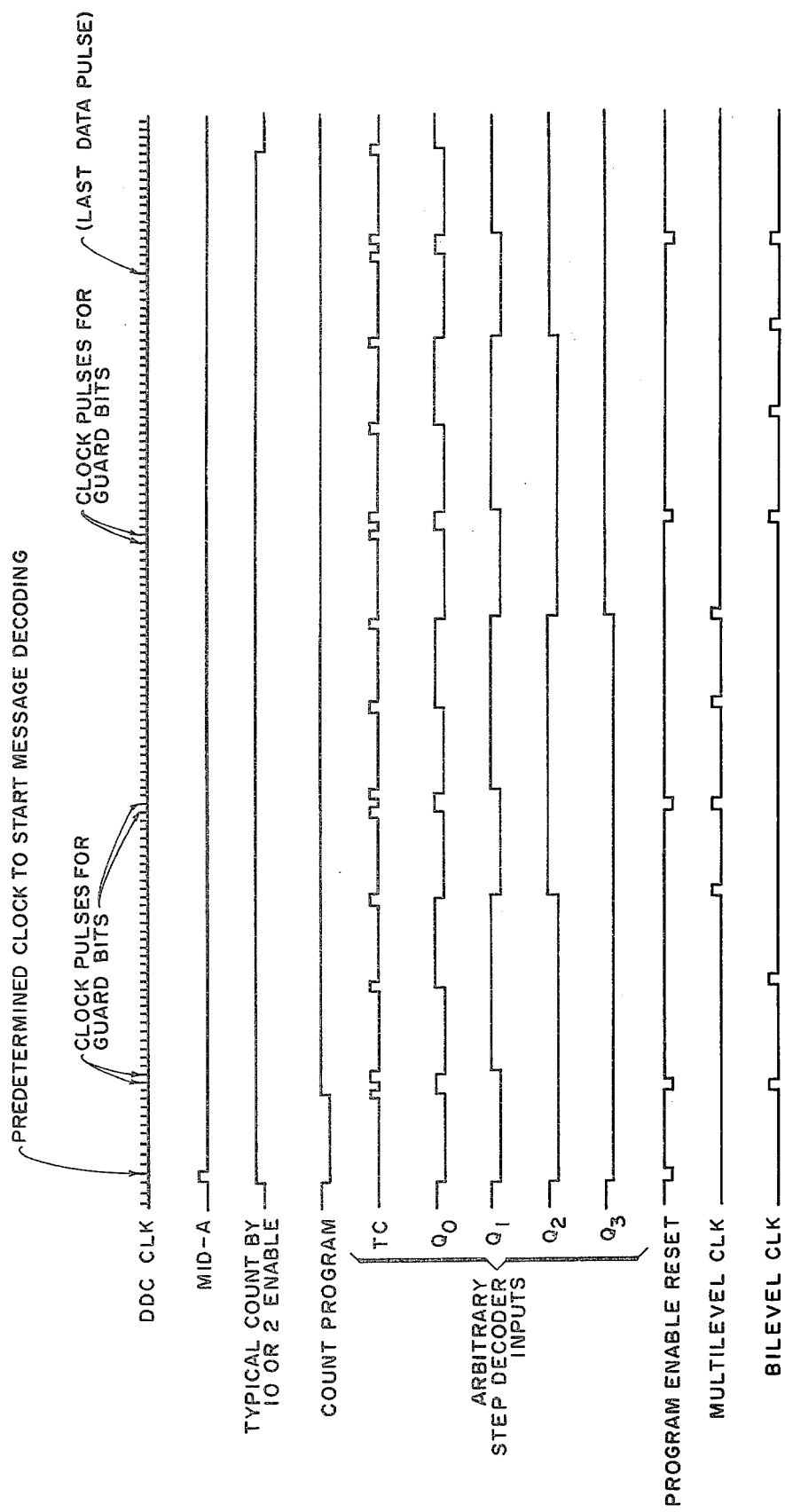
Fig. 3. DCC PARALLEL DECODING TIMING

MESSAGE IDENTIFICATION AND DATA ENTRY APPARATUS

BACKGROUND OF THE INVENTION

1. Field of the Invention

This invention relates to communication information processing, and more particularly to improved communication information processing apparatus for code identification and message decoding.

2. Description of the Prior Art

There are prior art apparatus and techniques for error detection and control in digital communications processing systems. In these types of systems such as that described in U.S. Pat. No. 3,713,095, there is provided logic circuitry which can detect illogical processor sequences by monitoring specific registers in the processor unit. The detection of any error condition results in the generation of an error signal.

A code validation system is disclosed in U.S. Pat. No. 3,492,643 for validating codes always having the same number of bits of the same given element. A specific arrangement of transistors is used as a comparator.

SUMMARY OF THE INVENTION

The present invention provides a means of examining a first sequence of data intended to indentify and accept subsequent data for at least one of a plurality of receivers (preferably carried aboard a missile) and then analyzing a second sequence of data which is entered after acceptance and is selectively gated to indicate how a third set of data is to be used. Message acceptance results when a predetermined binary pattern of the message correlates (in parallel fashion) with the pattern stored in the correlator. Upon message acceptance, decoding for valid information is accomplished by correlating the true or leading portion of each message word with the complement portion which immediately follows. Incoming information is continuously decoded, and whenever a message acceptance occurs, the message decoded output is stored in a buffer for further processing.

The apparatus can be used in conjunction with a clock invariant digital synchronizer which enters data into a shift register in response to clocks derived from the data (DDC), as described in copending application of Constantinos Philippides and William H. Zinger, Ser. No. 267,122 filed May 26, 1981, entitled Apparatus for Identifying Coded Information Without Internal Clock Synchronization, now U.S. Pat. No. 4,395,773, for use in uplink communication systems, radio and cable communications systems, telemetering data links, and other related and similar systems.

An important feature of the invention is to decode and process link data independently of internal clocking. The data link implemented produces message identification acceptance (MID-A), message data decoding and data complement check (DCC) generated clocks for message processing. A parallel data correlator is used for MID acceptance generation. Each bit of the transmitted message and of noise flowing through a register is examined by the correlator. Each bit of the transmitted message is shifted into a register at the internal frequency rate which has an average value equal to the data rate. MID acceptance results when the predetermined binary pattern of the MID portion of the uplink message correlates (in parallel fashion) with the pattern stored in the correlator buffer. The MID acceptance signal permits subsequent data bits to be analyzed. A clock invariant message decoder generates the link message data blocks of the supervisory and/or multilevel commands by selectively gating combinations of the subsequent data bits to generate known and predetermined message patterns. Outputs from the bilevel and multilevel decoders indicate whether digital or analog processing is ordered, although other meanings may be ascribed to the data in other applications.

Accordingly, an object of the invention is the provision of a means in a communication link for the recognition and decoding of bilevel and multilevel information.

Another object of the invention is the provision of a means in a communication link for the recognition and decoding of bilevel and multilevel information by comparing received data with a stored code word and comparing bits of the received data with each other in a predetermined order.

Another object of the invention is the provision of message identification acceptance signal generation without internal clock synchronization which eliminates the requirements for a synchronous clock and by not starting a clock at a fixed time with respect to the radio frequency output false starts are eliminated.

A further object is the provision of a parallel scheme for message identification acceptance recognition that eliminates precursor needs and eliminates bit pattern alterations caused by electromagnetic interference.

Still a further object of the invention is the provision of means of inhibiting correlator outputs due to random binary noise by means of a control signal generated whenever a threshold of noise is exceeded.

Yet another object of the invention is the provision of parallel decoding of data complement check codes in synchronization with the data clocks to produce bilevel and multilevel function error detection.

Other objects, advantages and novel features of the invention will become apparent from the following detailed description of the invention when considered in conjunction with the accompanying drawings.

BRIEF DESCRIPTION OF THE DRAWINGS

FIG. 1 is a schematic diagram of a preferred embodiment of the invention.

FIG. 2 is a timing diagram of the message identification parallel correlator of FIG. 1 and FIG. 3 is a timing diagram of the parallel data complement check decoder of FIG. 1.

DESCRIPTION OF THE PREFERRED EMBODIMENT

Referring now to the drawings wherein there is shown in FIG. 1 data register 10 for continuously receiving data. Derivative data and the derivative data clock may be received from the system described in the above referenced copending application.

The data in register 10 is continually checked for message acceptance by being correlated in parallel correlator 12 with an initial or updated message code. Correlator 12 includes a message code register 14 and parallel exclusive or gates 16. A coded word is entered into register 14 from message identification code generator, initializer and control 18. Gates 16 simultaneously match the least significant bit (LSB) in register 10 with the LSB in register 14, the next significant bit in register 10 with the next significant bit in buffer 14, and so on to the most significant bit (MSB) as shown. If there is correlation, i.e., message identification acceptance, a message identification trigger pulse is fed from AND gate 17 to AND gate 30. With the proper signals present, a message identification acceptance signal pulse is fed to message code generator 18, and to count enable control 19 of data complement check clock generator 22. Since all bits are checked simultaneously, an acceptance pulse at gate 20 may be derived at any clock pulse as data. An output pulse from gate 20 is identified as message acceptance, provides the update signal to code generator 18 and initiates timing clock generator 22. Any suitable code generator may be employed as the code generator 18 provided it responds to the output signal from gate 20 to update the code word in register 14 so that a comparison can be made with the occurrence of the next data derivative clock.

In operation and in accordance with the invention the data is continually clocked into MID acceptance and data complement clock register 10 with the DDC clock which is derived from the data itself, and continually checked for MID code matches by being correlated in parallel with the initial or updated MID codes. Each MID code bit is checked for parity with its equivalent data bit. Since all bits are checked simultaneously, an acceptance pulse may be derived at any clock pulse as data, or noise resembling data is detected, decoded, and processed.

Correlator 12 utilizes magnitude digital comparators which generate an output every time all inputs are equal (compared on a bit pair to pair basis for all pairs). The output is identified as the MID-A timing signal and all processor functions are referenced to this pulse. MID-A is considered the system's timing synchronization point.

FIG. 2 is the timing diagram of the MID parallel correlator. The data shown is an arbitrary message waveform clocked at the data average rate of the data derivative clock and produces MID acceptance signals at the last derivative clock pulse of the message identification portion of the transmission. This is arbitrarily set as there is never a time measure prior to MID acceptances.

MID initial or updated code from MID code generator 18 is latched into MID code register 14. Upon a MID acceptance, the digital processor control network 18 generates the sequential control steps which update the MID code and reload parallel correlator code register 14. If correlations do not occur within a specified time a control is activated by the initializer and the initially generated MID code is reapplied to the code register. During initialization a gate disables the MID-A gate network to eliminate MID acceptance pulses during that time.

To eliminate extraneous acceptances resulting from noise correlation, a noise control gate is applied to AND gate 20. When a signal arrives the noise is suppressed and the noise control is removed.

To eliminate MID-A race problems, an update gate is applied to AND gate 20. By gating the acceptance network with this control, any acceptance generated during updating operations is inhibited.

Following MID recognition, the DCC decoder 30 decodes the message and examines the remainder of the message for data complement errors. Information is continuously being fed to complement message buffer 40 for processing and action. Further processing and action depends on the presence of a MID-A signal and the output of DC decoder 30.

Uplink message decoder 30 is shown in FIG. 1. The complement check message register is shared with the MID-A register and is identified by reference number 10. The data is clocked into register 10 by the data derivative clock as described previously. Tapping the parallel outputs of the register 10 in selected fashions, the bilevel and multilevel functions of the message are decoded.

Bilevel decoding is accomplished by correlating the true bits ($T_1-T_K$) with their equivalent complement bits ($C_1-C_K$) in exclusive OR gates 32.

Multilevel decoding is accomplished by correlating the true bits ($T_1-T_L$) with their equivalent complement bits ($T_1-C_L$) in exclusive OR gates 34.

As can be seen, the means employed to provide decoding the data complement portion of a message is basically the same for both bilevel and multilevel functions. The decoder circuit shown in FIG. 1 correlates the leading or true (T) portion of each group within the message with its complement portion (C), which immediately follows. Each bilevel function is represented by a digital word in which half of the bits are the trude data bits and the other half are the complement bits of the first half part of the word. There are some functions that are transmitted but the word is not necessarily divided in half for the true and complement portions. In that case only the most significant data bits correlate.

In order for a message to be decoded by AND gate 35, all exclusive OR gates 32 must be true. In order for a message to be decoded by AND gate 37, all exclusive OR gates 34 must be true. In the special case where the word is not necessarily divided in half, correlation of a predetermined number of most significant bits will decode. For example, if the word is divided into 4 true and 6 complement bits, then the two least significant bits would be ignored.

Incoming information is continuously correlated and whenever a pattern is matched between N true and N complement bits a decoded output is derived. This output is significant only if a message acceptance pulse has been previously generated within the message.

Outputs from the bilevel and multilevel decoders initiate whether digital (bilevel) or analog (multilevel) processing is ordered. In the event of error detection the complement data message buffer is allerted and controls the data flow from the DCC register and output processing.

The decoded data is channeled through data combiner 36 to error detector and buffer 38. If there is no data decoded, a signal will be fed from buffer 38 to complement message buffer 40 to prevent further processing of the data being continuously received. If there is no error detected then data being clocked into buffer 40 will be allowed to be processed.

Data complement check clock 22 is shown in FIG. 1. It provides the DCC error detection and storage network with the appropriate timing to process decoded bilevel and multilevel message words. Based on a predetermined message length a group of clock pulses are generated every time MID acceptances are initiated. These clock pulses are in precise time synchronization with the MID-A pulse as well as with the DCC message data blocks.

With the system synchronized to the MID-A pulse the data derivative clocks providing synchronous counting are fully defined. FIG. 3 is the timing diagram of the message decoder. A count enable control from gate 20 resets and starts the program counter 21. The program 23 sets the predetermined number of DDC to be counted which corresponds to the number of bits within a message data block. Program 23 also provides for counting the number of bits which are inserted as guards between message data blocks.

Each counting program generates a terminal count (TC) (FIG. 3) of the program counter 21. The TC provides for program changes, for increment counting and for message data block decoding timing by setting the width of the step decoder 25 outputs.

Increment counter 27 produces an output for every message data block. These outputs are decoded, in a step fashion to pulses which provide for count enable control and for the generation of BL and ML clocks. The step clocks are sequenced in the DCC clock combining network 29 which provides clocks to the error detection and storage circuit. These clocks are fully synchronized to the decoded BL and ML data.

The clocks pertaining to the message data blocks and their guard blocks are shown in FIG. 3 in time sequence with respect to the appropriate message function.

Obviously many modifications and variations of the present invention are possible in the light of the above teachings. It is therefore to be understood that within the scope of the appended claims the invention may be practiced otherwise than as specifically described.

I claim:

1. Apparatus for the recognition and decoding of digital and analog information by comparing received data with a stored data word and comparing bits of the received data with each other in a predetermined order, comprising:

first comparator circuit means for comparing received data with a stored data word and providing a message identification and acceptance output signal in response to a correlation between said received data and said stored data word, second comparator circuit means for comparing bits of said received data with each other in a predetermined order and producing decoded output data in response to a correlation of the compared bits, error detection circuit means coupled to the output of said first and second comparator circuit means and providing an output error signal when there is no data decoded from said second comparator circuit, and data complement check clock generating means being connected to and being controlled by the output of said first comparator circuit means and having an output connected to said error detection circuit means for providing precise time synchronization between the outputs of said first and second comparator circuit means.

2. The apparatus of claim 1 wherein there is one gate for each pair of bits being compared.

* * * * *